United States Patent [19]
O'Donnell

[11] 3,826,455
[45] July 30, 1974

[54] BREAD WRAPPER HOLDER
[76] Inventor: William J. O'Donnell, 18 Scotch Pine Dr., Voorheesville, N.Y. 12186
[22] Filed: Apr. 9, 1973
[21] Appl. No.: 349,307

[52] U.S. Cl............... 248/97, 248/99, 248/150, 248/165, 248/188.8, 248/346, 403/213
[51] Int. Cl.............................. B65b 67/12
[58] Field of Search ....... 248/97, 99, 150, 153, 175, 248/107, 105, 95, 219, 249, 302, 303, 165, 188.8, 98, 101, 346; 211/42, 46, 11, 43, 85, 184, 181, 10, 44, 50, 51, 177; 403/206, 209, 213; 108/159

[56] References Cited
UNITED STATES PATENTS

| | | | |
|---|---|---|---|
| 386,674 | 7/1888 | Wells | 211/184 |
| 423,647 | 3/1890 | Wells | 211/184 X |
| 993,964 | 5/1911 | Davis | 248/98 |
| 1,691,571 | 11/1928 | Haven | 248/98 |
| 2,642,861 | 6/1953 | Tvedt | 211/51 |
| 2,969,155 | 1/1961 | Atkinson | 403/213 X |
| 3,143,330 | 8/1964 | Williams | 211/85 X |
| 3,263,355 | 8/1966 | March | 211/177 X |
| 3,295,694 | 1/1967 | Nejezchleb et al. | 248/99 X |
| 3,633,859 | 1/1972 | Vosbikian | 248/97 |
| 3,737,129 | 6/1973 | Foster | 248/97 |

Primary Examiner—Roy D. Frazier
Assistant Examiner—Rodney H. Bonck
Attorney, Agent, or Firm—Walter F. Wessendorf, Jr.

[57] ABSTRACT

Discloses a bread wrapper holder having two U-shaped frames and a base mounting an empty bread wrapper for use as a disposable trash and garbage bag. The sides of the bread wrapper are disposed between the U-shaped frames and cuffed over the U-shaped frames. The U-shaped frames have terminal portions received in aligned slots and holes formed in the base to assemble the U-shaped frames in removable, positive-locked relationship with the base.

5 Claims, 4 Drawing Figures

PATENTED JUL 30 1974

3,826,455

BREAD WRAPPER HOLDER

This invention relates to a bread wrapper holder for receiving and mounting an empty, used plastic bread wrapper for use as a disposable trash and garbage bag for kitchen scraps, waste, trash and the like.

The objects of this invention are to contribute to the solution of the problems of the art by providing a bread wrapper holder which receives and mounts either a used, conventional "king-size" plastic bread wrapper or a "regular-size" bread wrapper, by providing a bread wrapper holder which is of simple, inexpensive but durable construction, by providing a bread wrapper holder which consists merely of three elements: two identical U-shaped frames and a supporting base therefor, by providing a bread wrapper holder which can easily, simply and quickly assembled without resort to tools or complicated and involved assembly techniques, which can be just as easily, simply and quickly disassembled for storage and which can be packaged and shipped disassembled, and by providing a bread wrapper holder whose base functions as a platform to support the weight of the scraps, waste and trash disposed within the mounted bread wrapper.

These objects and other objects of the invention should be discerned and appreciated from the detailed specification taken in conjunction with the drawings, wherein like reference numerals refer to similar parts throughout the several views, in which.

Figure 1:
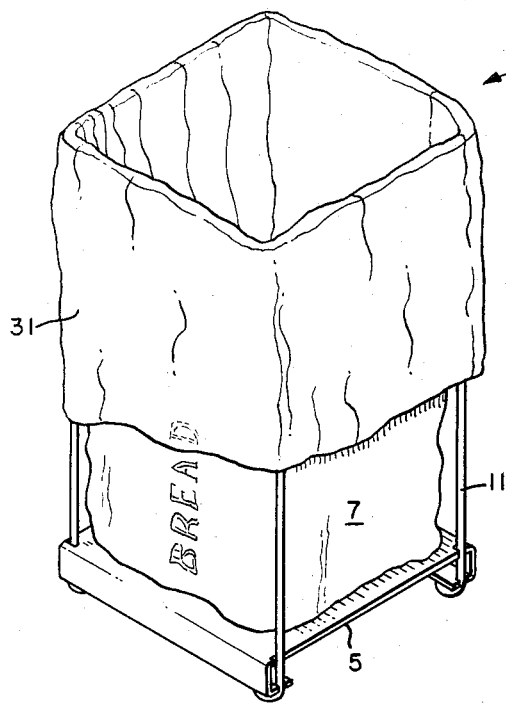
FIG. 1 is a perspective view of the bread wrapper holder in its assembled condition receiving and mounting a bread wrapper.
Figure 2:
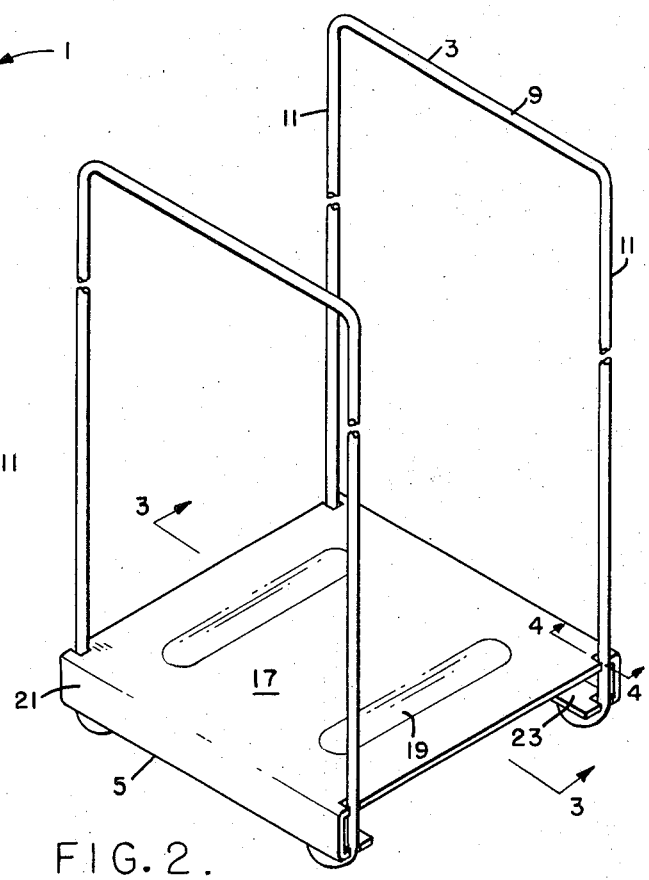
FIG. 2 is a perspective view of the bread wrapper holder in its assembled condition.
Figure 3:
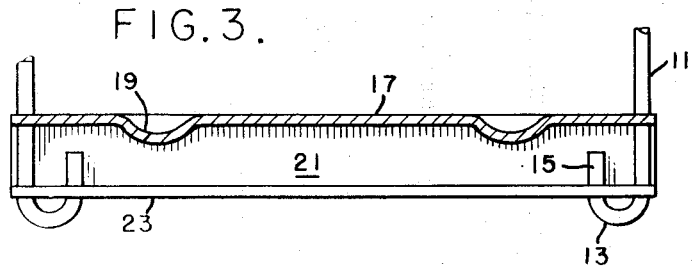
FIG. 3 is a view taken in the direction of the arrows 3 — 3 in FIG. 2.
Figure 4:
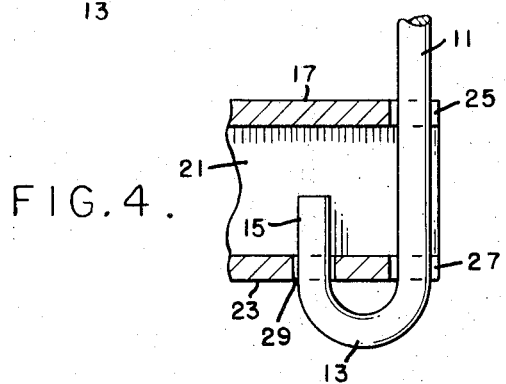
FIG. 4 is a view taken in the direction of the arrows 4 — 4 in FIG. 2.

To facilitate the understanding of the invention, a nomenclature list is hereby provided:

NOMENCLATURE

| | |
|---|---|
| 1 | generally refers to invention |
| 3 | U-shaped frame |
| 5 | base |
| 7 | bread wrapper |
| 9 | top portion of U-shaped frame 3 |
| 11 | depending leg of U-shaped frame 3 |
| 13 | reverse curve portion of depending leg 11 |
| 15 | short upstanding leg from reverse curve portion 13 |
| 17 | flat platform of base 5 |
| 19 | elongated bead in flat platform 17 |
| 21 | depending sidewall from flat platform 17 |
| 23 | lip portion transversely extending from sidewall 21 |
| 25 | slot in flat platform 17 |
| 27 | slot in lip portion 23 |
| 29 | hole in lip portion 23 |
| 31 | cuffed or folded over portion of bread wrapper 7 |

In FIG. 1 of the drawings, reference numeral 1 generally refers to the invention, two identical U-shaped frames 3 and base 5 receive and mount a bread wrapper 7 with the U-shaped frames 3 permitting the bread wrapper 7 to be disposed and mounted therewith in cuffed or folded over relationship, as shown.

Each U-shaped frame 3 is preferably of wire-like or other suitable material. has a top portion 9, depending legs 11 therefrom substantially in parallel relationship and whose terminal portions form reverse curve portions 13 terminating as upstanding short legs 15.

Base 5 is preferably of metal or other suitable material and has a flat platform 17 with elongated beads 19 formed therewith to impart strenght and structural rigidity thereto. Side walls 21 depend from flat platform 17 and lip portions 23 substantially parallel to flat platform 17 extend transversely inwardly from the bottoms of side walls 21.

Aligned slots 25 and 27 are formed, as shown, through the flat platform 17 and lip portions 23, respectively. The width of slots 25 and 27 is complemental to the diameter of depending legs 11 of U-shaped frames 3. Holes 29 formed through lip portions 23, as shown, are complemental to the diameter of short upstanding legs 15.

In the assembly of the bread wrapper holder 1, the U-shaped frames are arranged and disposed relative to base 5, as shown in the drawings, and such that the short legs 15 are received through holes 29 in lip portions 23 and the lower portions of depending legs 11 of U-shaped frames 3 are received by aligned slots 25 and 27 in respective flat platform 17 and lip portions 23. The assembly of bread wrapper holder 1 as described results in U-shaped frames 3 being in removable, positive-locked relationship with base 5 and in substantial parallel relationship with each other. For disassembly of bread wrapper holder 1, the short upstanding legs 15 are removed from holes 19 and the lower portions of depending legs 11 are removed from aligned slots 25 and 27. It should be noted that the reverse curve portions 13 rest upon the countertop or surface upon which the bread wrapper holder 1 is emplaced, and that, with only the bottoms of the reverse curve portions 13 so resting on the countertop, it is relatively easy to move the bread wrapper holder 1 along and upon the countertop because of the friction-free engagement of the reverse curve portions 13 with the countertop.

The empty, used bread wrapper 7 is received and mounted on the assembled bread wrapper holder 1 by disposing the closed bottom end of the bread wrapper 7 on the flat platform 17 of base 5 and with the external sides of the empty bread wrapper 7 positioned between the U-shaped frames 3 and with the bread wrapper open end up, then the external sides of the bread wrapper 7 are suitably cuffed or folded over the resilient U-shaped frames 3 such that the bread wrapper 7 is neatly emplaced relative to the U-shaped frames 3 and flat platform 17. As thus neatly emplaced, the bread wrapper 7 is disposed in its retained open position to function as a trash and garbage bag for kitchen scraps, waste, trash and the like. When filled, the cuffed or folded over portion 31 is pulled upwardly to extent allowed and the filled bread wrapper is removed from holder 1. The cuffed or folded over portion 31 facilitates removal and constitutes an unused portion of bread wrapper 7 that can be tied in a knot to render the contents of the filled bread wrapper moisture-proof and odor-tight for clean, neat and convenient disposal purposes.

The natural resiliency of U-shaped frames 3 and in particular their depending legs 11 permits the bread wrapper 7 to be neatly mounted on holder 1 and to facilitate removal of the bread wrapper 7 after same is filled. This natural resiliency further serves to accommodate the minor variations in size of available bread wrappers cross-sectionally.

After bread is consumed, the empty bread wrapper must be disposed of. Hence, reusing the empty bread wrapper for further trash and garbage disposal provides favorable ecological benefits without the attendant costs involved in purchasing special plastic garbage bags for kitchen scraps, waste and trash.

For the noted ecological and cost-saving benefits, it is preferred that empty, used bread wrappers be used. However, it should be appreciated that this invention can be used to receive and mount conventional plastic garbage bags.

Having thusly described my invention, I claim:

1. A bread wrapper holder having two U-shaped frames and a base for receiving and mounting a used, empty bread wrapper for use as a disposable trash and garbage bag for kitchen scraps, waste, trash and the like, said bread wrapper having a closed end, sides and open end, and said holder receiving and mounting said bread wrapper by disposition of said bread wrapper closed end on said base and disposition of said bread wrapper sides between said U-shaped frames with said bread wrapper open end in an upright position and said bread wrapper sides above said U-shaped frames being downwardly cuffed over said U-shaped frames; each of said U-shaped frames having depending legs, said depending legs having lower portions and terminal portions formed as reverse curve portions terminating as upstanding short legs, said reverse curve portions of said terminal portions extending below the lowermost portion of said base, said base having a flat platform, side walls depending therefrom and lip portions extending transversely inwardly from said side walls, said flat platform mounting said bread wrapper closed end said flat platform and lip portions having aligned slots formed therethrough, said lip portions having holes formed therethrough, said U-shaped frames being disposed in removable, positive-locked relationship with said base by said upstanding short legs being disposed through said holes in said lip portions and said lower portions of said depending legs being received by said aligned slots in said flat platform and lip portions, and said reverse curve portions having bottoms adapted to rest upon a countertop or surface upon which said holder is emplaced, to facilitate friction-free movement of said holder on said countertop.

2. A bread wrapper holder in accordance with claim 1, wherein said flat platform of said base has elongated beads formed therewith to impart strength and structural rigidity thereto.

3. A bread wrapper holder in accordance with claim 1, wherein said depending legs of each U-shaped frame are substantially parallel to each other and said U-shaped frames are substantially parallel to each other.

4. A bread wrapper holder in accordance with claim 1, wherein said depending legs of said U-shaped frames are resilient to permit said bread wrapper to be mounted neatly on said holder, to accommodate minor variations in cross-sectional size of a bread wrapper and to facilitate removal of said bread wrapper from said holder.

5. A bread wrapper holder in accordance with claim 1, wherein said flat platform of said base has elongated beads formed therewith to impart strength and structural rigidity to said flat platform; wherein said depending legs of each U-shaped frame are substantially parallel to each other and wherein said U-shaped frames are substantially parallel to each other; and wherein said depending legs of said U-shaped legs are resilient to permit said bread wrapper to be mounted neatly on said holder, to accommodate minor variations in cross-sectional size of a bread wrapper and to facilitate removal of said bread wrapper from said holder.

* * * * *